United States Patent [19]

Erickson et al.

[11] 3,798,510

[45] Mar. 19, 1974

[54] TEMPERATURE COMPENSATED ZENER DIODE FOR TRANSIENT SUPPRESSION

[75] Inventors: John M. Erickson; Bernard Reich, both of Ocean County, N.J.

[73] Assignee: The United States of America as represented by the Secretary of the Army, Washington, D.C.

[22] Filed: Feb. 21, 1973

[21] Appl. No.: 334,339

[52] U.S. Cl...... 317/234 R, 317/234 A, 317/234 W, 317/235 T

[51] Int. Cl............................... H01l 3/00, H01l 5/00

[58] Field of Search.......... 317/234, 11, 235, 30, 31

[56] References Cited

UNITED STATES PATENTS

| | | | |
|---|---|---|---|
| 3,319,136 | 5/1967 | Perry et al. | 317/234 W |
| 3,363,150 | 1/1968 | Whitman et al. | 317/234 W |
| 3,484,659 | 12/1969 | Nagai et al. | 317/235 T |
| 3,489,959 | 1/1970 | Mahn | 317/234 W |
| 3,551,757 | 12/1970 | Kristensen | 317/235 T |
| 3,593,186 | 7/1971 | Dench | 317/234 W |

FOREIGN PATENTS OR APPLICATIONS

| | | | |
|---|---|---|---|
| 1,060,668 | 3/1967 | Great Britain | 317/235 T |

*Primary Examiner*—Andrew J. James
*Attorney, Agent, or Firm*—Edward J. Kelly; Herbert Berl

[57] ABSTRACT

A Zener diode unit having zero temperature coefficient for breakdown voltage, for power applications in ground vehicle and aircraft electrical systems for shielding of voltage-sensitive solid-state circuits against voltage transients.

3 Claims, 2 Drawing Figures

PATENTED MAR 19 1974 3,798,510

TEMPERATURE COMPENSATED ZENER DIODE FOR TRANSIENT SUPPRESSION

BACKGROUND OF THE INVENTION

Zener diodes are used extensively to obtain an upper limit of voltage at the power supply or the load. "Zener and Avalanche Diodes" by Todd, Wiley-Interscience, copyright 1970 provides substantial background on the subject. They have been used in ground vehicles and aircraft for protection of sensitive electronic equipment against transients in the electrical systems. When battery connections are defective or disturbed or other circumstances occur whereby there is little or no battery support, voltage regulator performance is degraded and severe voltage transients occur.

If maximum voltage rating of a transistorized or integrated circuit is exceeded, its reliability is reduced and it is subject to possible catastrophic failure; if the circuit is overdesigned to tolerate the voltage rises, cost is increased. When available Zener diodes were limited to 50 watts, they were used with a fuse or circuit breaker. Replacement of the fuse or resetting of the circuit breaker was necessary to restore interrupted circuit operation. More advanced Zener diodes, e.g. 400 watts at about 33 volts, recently available, extend circuit operation without circuit cutoff to voltage transients having a substantially higher energy level.

Variation in Zener breakdown voltage with change in diode junction temperature reduces its effectiveness as a transient suppressor. An essentially zero temperature coefficient for breakdown voltage is characteristic of a Zener diode with a breakdown voltage rating of about 5.5 volts. As Zener diode voltage rating is increased, the temperature coefficient for Zener breakdown voltage increases. In a high power Zener diode, junction temperature rise during a surge is significant. A close approximation of Zener breakdown voltage deviation in millivolts per degree C. is obtained by multiplying the numerical difference of the Zener breakdown voltage rating and the voltage rating for zero temperture coefficient ($V_z - 5.5$) with the numerical difference between the junction temperature, $T_J$ in degrees C., that obtains from self-heating during a transient and ambient temperature, $T_A$, in degrees C.

Example: If $V_z = 33$ volts at $T_A = 30°$ C.

and $T_J = 250°$ C. due to self-heating $$(33 - 5.5)\ mv/\text{degrees C.} \times (250 - 30)°\text{C.} = 6.05 \text{ volts}$$

$$\text{then } V_z = 33 + 6.05 = 39.05 \text{ volts}$$

If at another time, ambient temperature were −40° C.

$$\text{then } T_J = -40° \text{ C.}$$

$$(33 - 5.5)\ (30 - (-40)) = 1.92\text{V}$$

$$\text{then } V_z = 33 - 1.92 = 31.08 \text{ volts}$$

Whether the temperature variation is due to change in ambient temperature or to self heating or to a combination of both, the effect is the same. Methods of reducing the temperature coefficient by connecting two or more Zener diodes of lower breakdown voltage rating that sum to the breakdown voltage required is well known. For example, individal diodes are connected in series with conductor wire. For power circuits, series-connected diodes are mounted on but electrically insulated from a common heat dissipating member and they are connected in series with conductor wire.

SUMMARY OF THE INVENTION

This invention concerns a compact unitary assembly of several stacked Zener diodes in additive series, each having about 5.5 breakdown voltage, sealed in a heat dissipating housing.

DESCRIPTION OF THE PREFERRED EMBODIMENT

Figure 1:
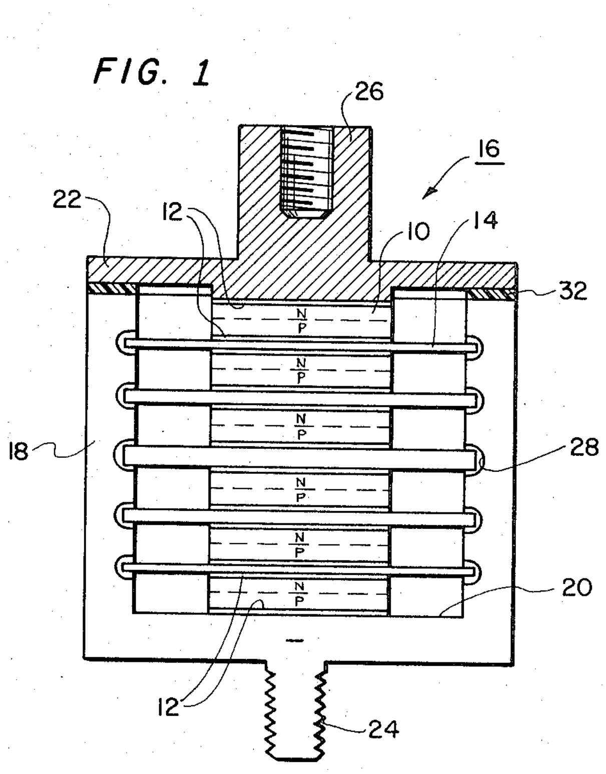
Figure 2:
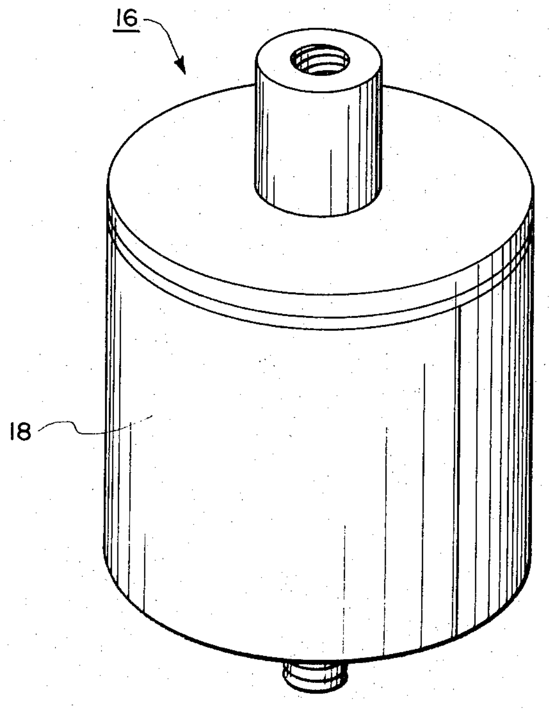

FIG. 1 is a side view of a preferred embodiment of the invention with part of the housing not in place; and FIG. 2 is perspective view of the embodiment shown in FIG. 1.

The preferred embodiment shown in FIG. 1 includes a stack of a plurality of essentially identical PN junction wafers 10. Each of the wafers are flat and circular having been sliced from a rod of silicon and subsequently doped to form the PN junction by well known techniques. Current carrying capacity and Zener breakdown voltage determine dimensions. The Zener breakdown voltage of wafer 10 is about 5.5 volts, for zero temperature coefficient. A thin disk 12 of tungsten or molybdenum is soldered to each face of each wafer and a flat circular heat sink member 14 is soldered between successive wafer sandwiches, all elements being in axial alignment. Tungsten or molybdenum disks 12 provide compatible temperature coefficients of expansion to the contiguous surfaces. Thickness of the heat sink members is graduated; the center heat sink member is thickest and the end heat sink members are thinnest. The stacked wafers, tungsten disks and flat heat sink members are in electrical series by direct contact. Zener breakdown voltage of the combination is equal to the sum of the Zener breakdown voltages of all the wafers in the stack.

A housing 16 confines the wafer stack. The housing includes a cup-shaped member 18, only one half of which is shown in FIG. 1, with a flat inside bottom face 20 and cover member 22. Integral terminal connections 24 and 26 extend axially from the cup-shaped member and from the cover member, respectively. One end of the stack is soldered to the cover member and the stack nests in the cup-shaped member abutting the inside bottom face and the heat sink members extend into circular recesses 28 that are axially spaced along the inside of the cup-shaped member. Silicone paint or other suitable electrical insulating material having suitable heat transfer properties is deposited or painted on the perimeter of the heat sink members and allowed to cure. A second coating of the same insulating material is deposited or painted on the first one and, while the insulation material is tacky, the stack is inserted into the housing. In this manner, the insulating material is distributed between the heat sink members and the circular recesses for good heat transfer. An insulation washer 32 is disposed between overlapping surfaces of the cover member and the cup-shaped member.

The cup-shaped member 18 is formed in at least two parts that are bonded or otherwise joined together as shown in FIG. 2 to complete the sealed assembly after the stack is in place.

The number of wafers in the stack is determined by the required Zener breakdown voltage. Where the required Zener breakdown voltage is not an integral multiple of 5.5 volts, each wafer is designed for a breakdown voltage higher than 5.5 volts or all but one is designed for a breakdown voltage of 5.5 volts and the remaining wafer is designed for the voltage, greater than 5.5 volts needed to make up the total breakdown voltage required; a larger heat sink may be provided for the odd wafer.

The description has presumed application in a power circuit. A Zener diode according to this invention for use in a lower power circuit but in an environment where ambient temperature swings widely, does not require heat sinks, tungsten disks, or even the housing decribed. The stack of comparatively small dimensions may be housed or embedded in an insulating material.

Obviously many modifications and variations of the present invention are possible in the light of the above teachings. It is therefore to be understood, that within the scope of the appended claims, the invention may be practiced otherwise than as specifically described.

What is claimed is:

1. A temperature compensated Zener diode combination comprising a plurality of stacked PN junction wafers in additive electrical series, each PN junction having a Zener breakdown voltage of about 5.5 volts, whereby said Zener diode combination has a breakdown voltage equal to the sum of the breakdown voltages of the stacked wafers, a pair of thin temperature coefficient of expansion matching elements sandwiching and bonded to each PN junction wafer in the stack, a flat circular heat sink element between each pair of wafer sandwiches in the stack, all of said wafer sandwiches and said heat sink elements being bonded together in conducting relationship, a housing nesting said stacked wafer sandwiches and heat sink elements and having a pair of terminal connections in series therewith, the interior of said housing being circular and having a circular recess for each heat sink element, each of said flat circular heat sink elements extending to the surrounding housing and into respective recesses in the housing for heat transfer to the housing, and electrical insulation between the heat sink elements and the housing.

2. The combination defined in claim 1 wherein, the thicknesses of the heat sink elements are graduated, the central heat sink element being thickest and the end heat sink elements being thinnest.

3. The combination defined in claim 1 wherein said housing includes a cup-shaped member wherein one terminal connection is an integral extension of the cup-shaped member and a cover member electrically engaging the contiguous end of the stack, and electrical insulation separating the cover member and the cup-shaped member, the other of said pair of terminal connections being an integral extension of said cover member.

* * * * *